United States Patent [19]

Fukunaga et al.

[11] Patent Number: 5,323,885

[45] Date of Patent: Jun. 28, 1994

[54] VIBRATION DAMPING DEVICE WITH GROOVES

[75] Inventors: Kanji Fukunaga; Hidetaka Watanabe, both of Hyogo, Japan

[73] Assignee: Mitsubishi Denki Kabushiki Kaisha, Tokyo, Japan

[21] Appl. No.: 950,324

[22] Filed: Sep. 24, 1992

[30] Foreign Application Priority Data

Oct. 29, 1991 [JP] Japan ................... 3-311619

[51] Int. Cl.⁵ .................. F16F 11/00; B60G 13/00
[52] U.S. Cl. .................... 188/381; 267/196; 369/263
[58] Field of Search ............. 369/263 X; 188/381 X, 188/119; 267/196 X, 201, 214; 92/85 B, 143; 91/24, 25, 399, 405, 409

[56] References Cited

U.S. PATENT DOCUMENTS

| | | | |
|---|---|---|---|
| 4,027,750 | 6/1977 | Kawamoto et al. | 188/73.45 |
| 4,071,252 | 1/1978 | Gillespie | 369/263 |
| 4,425,836 | 1/1984 | Pickrell | 91/409 X |
| 4,590,818 | 5/1986 | Teraoka | 92/85 B X |
| 4,856,620 | 8/1989 | Thiel et al. | 188/73.45 X |
| 4,937,806 | 6/1990 | Babson et al. | 369/263 X |
| 4,985,884 | 1/1991 | Watanabe et al. | 369/263 |
| 5,183,137 | 2/1993 | Siwek et al. | 188/381 |

FOREIGN PATENT DOCUMENTS

| | | | |
|---|---|---|---|
| 340693 | 4/1991 | Japan . | |
| 1232875 | 5/1986 | U.S.S.R. | 188/381 |
| 2041121 | 9/1980 | United Kingdom | 188/73.44 |

Primary Examiner—Edward K. Look
Assistant Examiner—John Ryznic

[57] ABSTRACT

The construction of a vibration damping device includes a splined or generally spiral groove formed either in the outer periphery of a damper pin, which is inserted into a damper, or in the inner periphery of a hole formed in the damper for inserting the damper pin therein.

9 Claims, 4 Drawing Sheets

VIBRATION DAMPING DEVICE WITH GROOVES

BACKGROUND OF THE INVENTION

1. Field of the Invention

The present invention relates to a vibration damping device suitable mainly for a compact disk player or the like which is for use on a vehicle.

2. Description of the Related Art

FIGS. 1, 2 and 3 are sectional views showing a conventional vibration damping device for an on-vehicle compact disk player. In these figures, the reference numeral 1 denotes a damper as a second member; numeral 2 denotes a damper pin as a first member; numeral 3 denotes a second vibration member for mounting the damper 1 to a fixed frame (not shown); numeral 4 denotes a first vibration member to which is attached the damper pin 2; numeral 5 denotes a hole into which is inserted the damper pin 2; and numeral 6 denotes a viscous oil as a vibration absorber sealed into the damper 1.

The operation of the conventional vibration damping device will now be described. FIG. 1 shows a state in which the damper pin 2 began to be inserted into the hole 5 of the damper 1 in the case where the second and first vibration members 3, 4 are to be mounted together.

In this state, the damper pin 2 is pushed to the inner part of the hole 5 until its front end assumes a completely inserted state in contact with the innermost wall of the hole 5, as shown in FIG. 2, and in this state the vibration applied to a fixed frame (not shown) to which is mounted the second vibration member 3, is absorbed effectively by the vibration absorber 6 sealed in the damper 1, to diminish the vibration exerted on the first vibration member 4, thereby attaining a desired vibration damping performance.

In such a conventional vibration damping device, it is necessary that the hole 5 and the damper pin 2 be kept in close contact with each other in order to exhibit the desired vibration damping performance. So if there is made an attempt to enhance the degree of such close contact, not only does it becomes difficult to effect the insertion of the damper pin 2 but also the air present in the hole 5 at the beginning of the insertion of the pin will not be exhausted and will stay within the hole, as shown in FIG. 3. As a result, the damper pin 2 can no longer be inserted into the hole to a complete extent and hence it is impossible to exhibit a satisfactory vibration damping performance.

SUMMARY OF THE INVENTION

The present invention has been accomplished for overcoming the above-mentioned problems.

It is the object of the present invention to provide a vibration damping device wherein, at the time of inserting a damper pin into a hole of a damper, the air present in the damper hole is discharged without lowering the degree of close contact between the damper pin and the hole, thus permitting the damper pin to be inserted completely to the innermost part of the hole.

According to the vibration damping device of the present invention, in order to achieve the above-mentioned object, a groove for discharging the gas stagnating in a chamber formed between a front end portion of the damper pin and the bottom of the damper hole is formed either in the outer periphery of the damper pin or in the inner periphery of the damper hole.

In the vibration damping device of such a construction, when the damper pin is inserted into the hole of the damper, the air present in the hole is exhausted to the exterior through the groove formed in the outer periphery of the damper pin or formed in the inner periphery of the damper hole, so that the damper pin is inserted into the hole completely up to the innermost part of the hole and there is attained as enhanced vibration damping performance.

The above and other objects and novel features of the present invention will more fully appear from the following detailed description when the same is read in connection with the accompanying drawings. It is to be understood, however, that the drawings are for illustration only and are not intended to restrict the scope of the invention.

DETAILED DESCRIPTION OF THE PREFERRED EMBODIMENTS

Preferred embodiments of the present invention will be described in detail hereinunder with reference to the accompanying drawings.

EMBODIMENT 1

Figure 1:
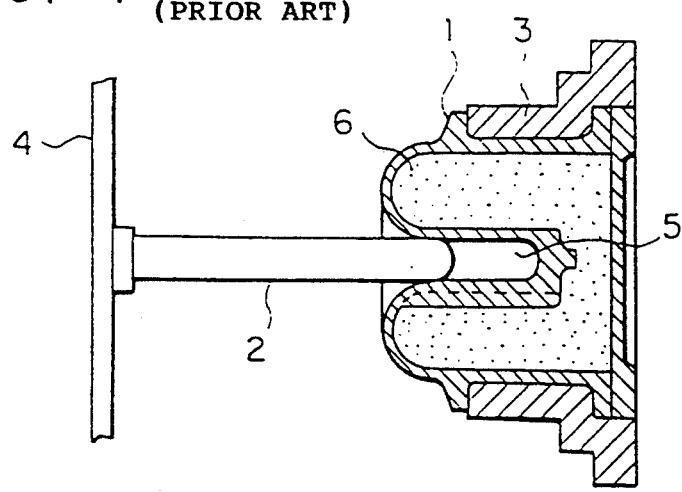
FIG. 1 is a sectional view of a conventional vibration damping device.
Figure 2:
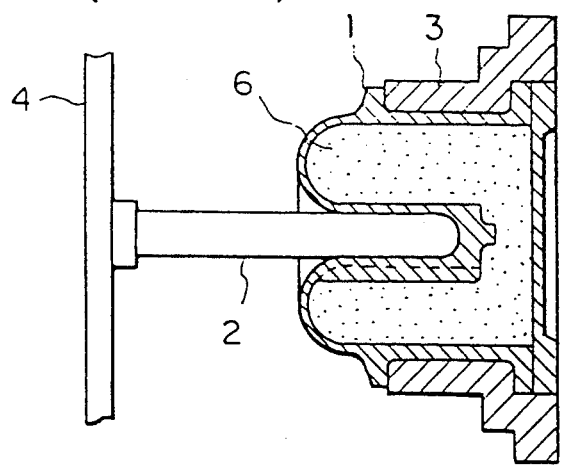
FIG. 2 is a view explanatory of the operation of the vibration damping device shown in FIG. 1.
Figure 3:
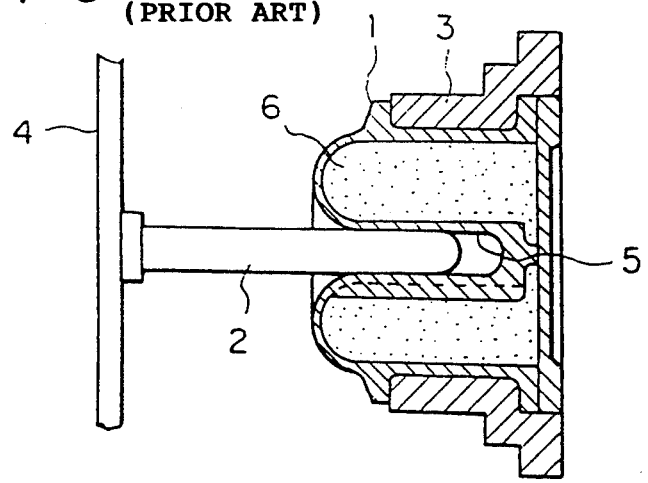
FIG. 3 is also a view explanatory of the operation of the vibration damping device shown in FIG. 1.
Figure 4:
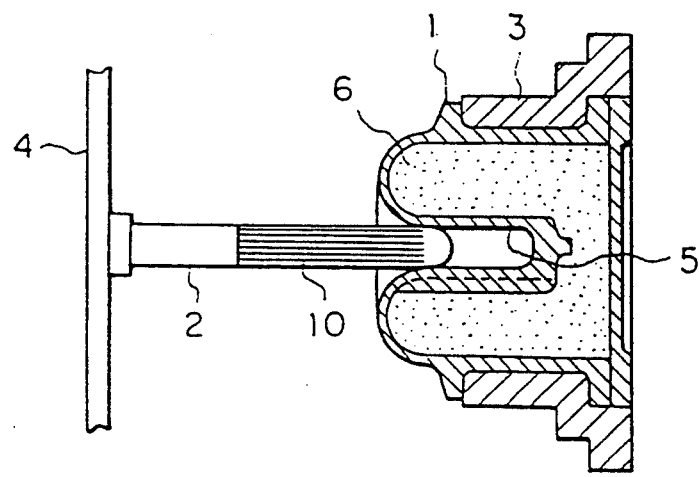
FIG. 4 is a sectional view of a vibration damping device according to a first embodiment of the present invention.
Figure 5:
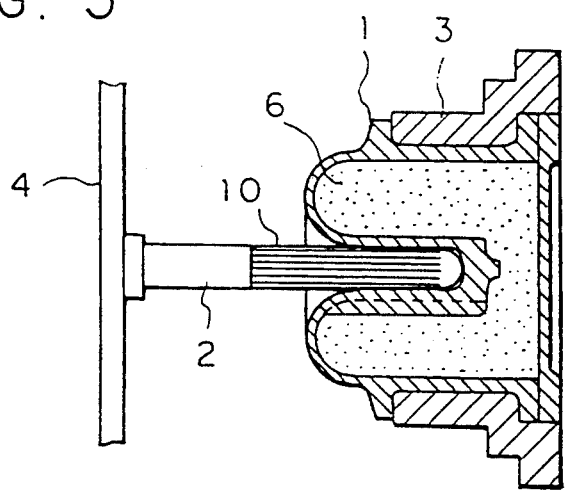
FIG. 5 is a view explanatory of the operation of the vibration damping device shown in FIG. 4.
Figure 6:
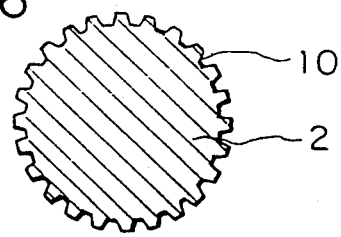
FIG. 6 is a sectional view showing a damper pin used in the first embodiment of the invention.

FIGS. 4 and 5 are sectional views showing a vibration damping device according to a first embodiment of the present invention, and FIG. 6 is a sectional view of a damper pin used in the first embodiment. In the drawings, the same portions as in the prior art are indicated by the same reference numerals as in the prior art. The numeral 10 denotes a splined groove formed in the damper pin 2.

The operation of this vibration damping device will be described below.

In the state shown in FIG. 4, air stagnates in the hole 5. In this state, as the damper pin 2 is inserted to the inner part of the hole 5, the air present in the hole 5 is discharged completely to the exterior through the splined groove 10 formed in the outer periphery of the damper pin 2. After the completion of assembly, therefore, the front end of the damper pin 2 can be inserted up to a position where the damper pin 2 contacts the innermost wall of the hole 5, as shown in FIG. 5.

EMBODIMENT 2

Figure 7:
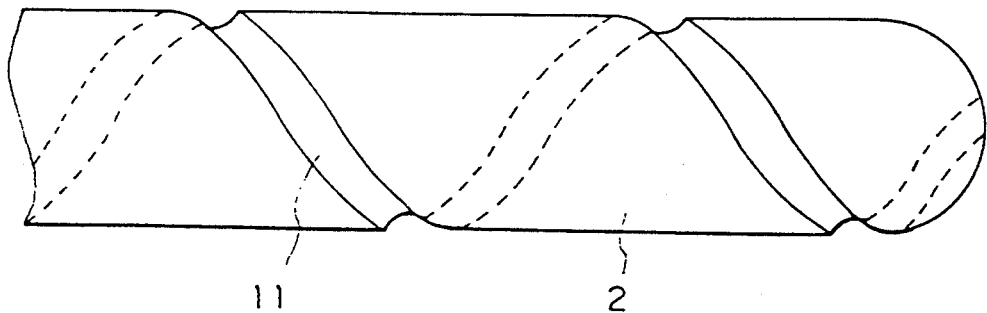
FIG. 7 is a sectional view showing a damper pin used in the second embodiment of the present invention.
Figure 8:
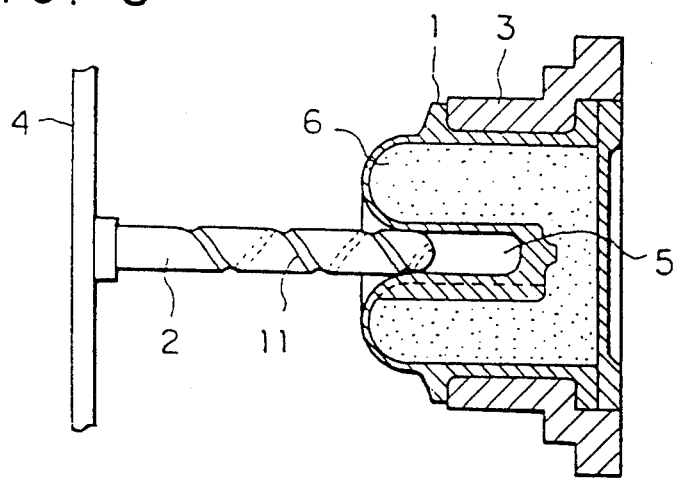
FIG. 8 is a sectional view of a vibration damping device according to the second embodiment of the present invention.
Figure 9:
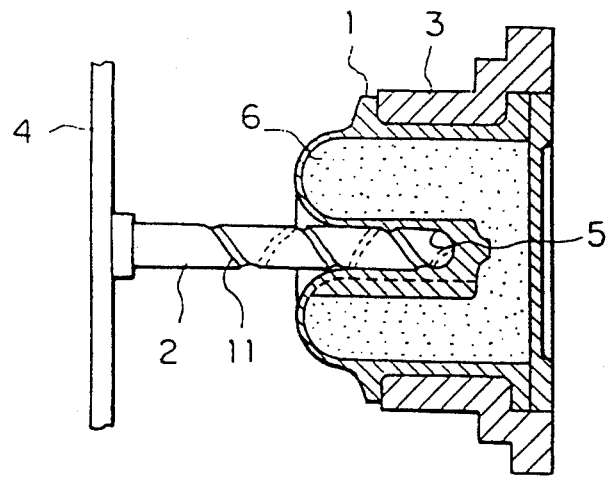
FIG. 9 is a view explanatory of the operation of the vibration damping device shown in FIG. 8.

Although in the first embodiment, the splined groove 10 is formed in the outer periphery of the damper pin 2 as the first member, a generally spiral groove 11 may be formed in the outer periphery of the damper pin 2, as shown in FIGS. 7, 8 and 9.

EMBODIMENT 3

Figure 10:
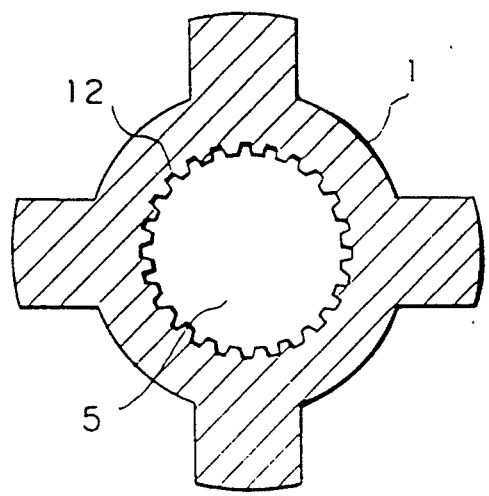
FIG. 10 is a sectional view showing a damper portion used in a third embodiment of the present invention.

Further, as shown in FIG. 10, a splined groove 12 may be formed in the inner periphery of the hole 5 of the damper 1 as the second member.

EMBODIMENT 4

Figure 11:
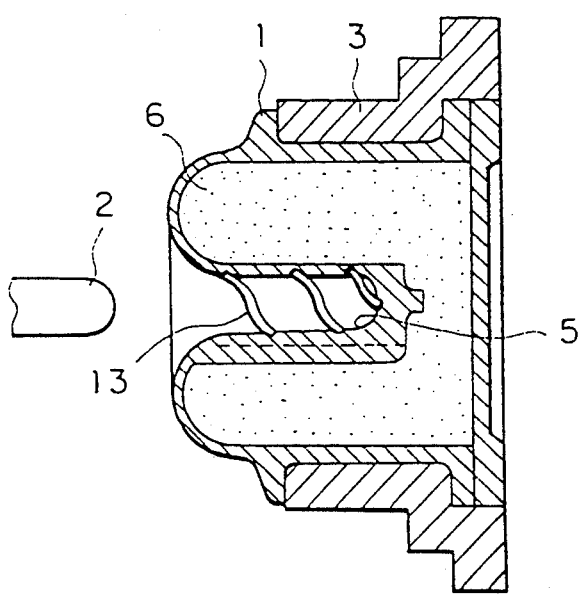
FIG. 11 is a sectional view showing a vibration damping device according to a fourth embodiment of the present invention.

As shown in FIG. 11, moreover, a generally spiral groove 13 may be formed in the inner periphery of the hole 5 of the damper 1.

It goes without saying that the vibration damping device of the present invention is also applicable to other devices than the foregoing on-vehicle compact disk player.

According to the present invention, as set forth above, since the damper pin can be inserted completely up to the innermost part of the hole of the damper body as the second member without resistance of the air present in the same hole, there can be obtained a vibration damping device which exhibits an enhanced vibration damping performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vibration damping device comprising:
   a vibration member;
   a damper pin attached to said first vibration member having a discharge groove formed in an outer periphery thereof; and
   a damper having a hole for insertion therein of said damper pin and a vibration absorbing material being sealed in the interior of said damper so that gas present in said hole is discharged through said discharge groove.

2. A vibration damping device according to claim 1, wherein said discharge groove comprises is a splined groove.

3. A vibration damping device according to claim 1, wherein said discharge groove comprises a generally spiral groove.

4. A vibration damping device comprising:
   a vibration member;
   a damper pin attached to said first vibration member; and
   a damper having a hole for insertion therein of said damper pin having a discharge groove formed in an inner periphery of said damper corresponding to said hole and a vibration absorbing material being sealed in the interior of said damper so that gas present in said hole is discharged through said discharge groove.

5. A vibration damping device according to claim 4, wherein said discharge groove comprises a splined groove.

6. A vibration damping device according to claim 4, wherein said discharge groove comprises a generally spiral groove.

7. A method for damping vibrations comprising the steps of:
   (a) attaching a damper pin to a vibration member;
   (b) inserting said damper pin into a hole of a damper with a discharge groove formed in an outer periphery of said damper pin or an inner periphery of said damper corresponding to said hole, said damper having a vibration absorbing material being sealed in the interior thereof; and
   (c) discharging gas present in said hole through said discharge groove.

8. A method for damping vibrations according to claim 7, wherein said discharge groove comprises a splined groove.

9. A method for damping vibrations according to claim 7, wherein said discharge groove comprises a generally spiral groove.

* * * * *